United States Patent

Yoshimoto et al.

[19]

[11] Patent Number: 5,933,251
[45] Date of Patent: *Aug. 3, 1999

[54] IMAGE FORMING APPARATUS WITH A FIRST BODY PORTION SHIFTED RELATIVE TO A SECOND BODY PORTION TO PROVIDE A VIEW OF A PAPER DISCHARGING SECTION LOCATED BETWEEN THE BODY PORTIONS

[75] Inventors: Mitsuharu Yoshimoto; Tetsuro Tomoe; Yoshifumi Okauchi; Naoyuki Ishida; Tadahiro Kiyosumi, all of Osaka, Japan

[73] Assignee: Mita Industrial Co., Ltd., Osaka, Japan

[ * ] Notice: This patent is subject to a terminal disclaimer.

[21] Appl. No.: 08/861,785

[22] Filed: May 22, 1997

[30] Foreign Application Priority Data

May 31, 1996 [JP] Japan ................................ 8-138389

[51] Int. Cl.$^6$ ........................................... H04N 1/04
[52] U.S. Cl. ......................... 358/496; 358/498; 358/474
[58] Field of Search .................................. 358/498, 496, 358/474, 497; 399/405

[56] References Cited

U.S. PATENT DOCUMENTS 5,680,203 10/1997 Kobayashi et al. ................... 358/498
5,715,500  2/1998 Nakazato et al. ..................... 358/496
5,796,496  8/1998 Ono ....................................... 358/498

*Primary Examiner*—Joseph Mancuso
*Assistant Examiner*—Hien Truong
*Attorney, Agent, or Firm*—Smith, Gambrell & Russell, LLP Beveridge, DeGrandi, Weilacher & Young Intellectual Property Group

[57] ABSTRACT

An image forming apparatus has an optical system, an image forming section and a paper conveying section provided in its main body. The main body includes a first portion containing the optical system and a second portion containing the image forming section and the paper conveying section below the first portion. A paper discharging section opening toward the front is provided between the first portion and the second portion. The first portion is shifted by a predetermined amount backward with the position where it is lined up to a second portion as a basis. It is easy to visually confirm whether or not there is a paper sheet in the paper discharging section below the first portion.

5 Claims, 6 Drawing Sheets

F I G. 6
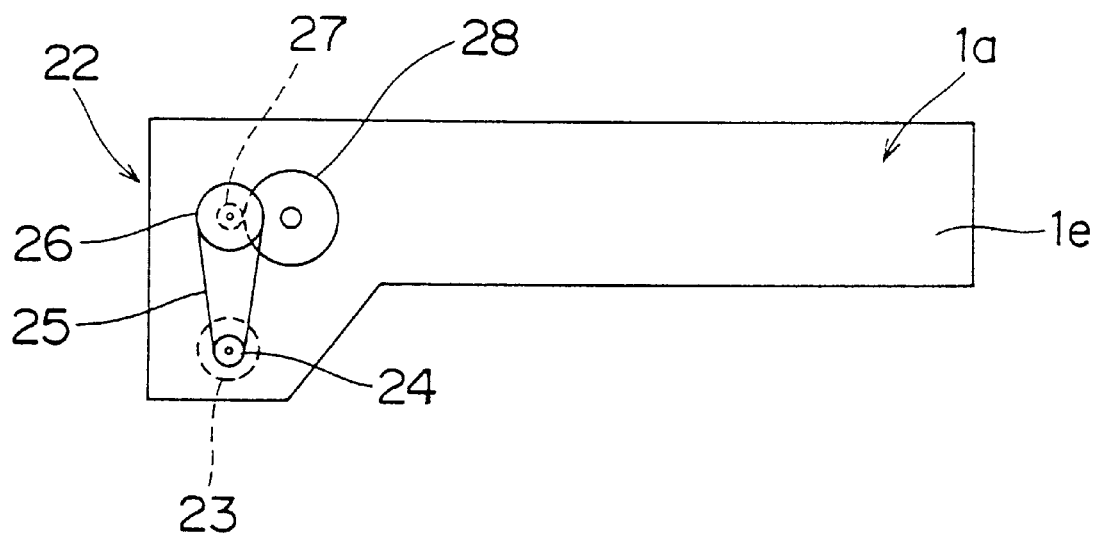

IMAGE FORMING APPARATUS WITH A FIRST BODY PORTION SHIFTED RELATIVE TO A SECOND BODY PORTION TO PROVIDE A VIEW OF A PAPER DISCHARGING SECTION LOCATED BETWEEN THE BODY PORTIONS

CROSS REFERENCE TO RELATED APPLICATION

This application claims priority benefits under 35 USC § 119 of Japanese Patent Application Serial No. 8-138389 filed on May 31, 1996, the disclosure of which is incorporated by reference.

BACKGROUND OF THE INVENTION

1. Field of the Invention

The present invention relates to an image forming apparatus capable of performing a multi-function such as a copy function and a facsimile function.

2. Description of Related Art

In recent years, the demand for an image forming apparatus performing a multi-function has been increased. There is provided an image forming apparatus on which a copy function, a FAX function, a printer function, a PC-FAX function, a scanner function, and the like are carried, for example. Such a multi-function image forming apparatus can be used even in a narrow office because significant economy of space is achieved, as compared with a case where a plurality of apparatuses corresponding to the respective functions are arranged.

On the other hand, when a paper feeding cassette for feeding paper sheets for image recording and a paper discharge tray for discharging the paper sheets each having an image recorded thereon are projected from both sides of the main body of the image forming apparatus, a wider setting space is required. Therefore, there is provided an image forming apparatus so adapted that a paper feeding cassette can be loaded in its main body and having a paper discharge space provided in the main body.

Generally, a space in front of the main body of the image forming apparatus is a vacant space for operating the image forming apparatus, so that the paper feeding cassette can be taken out forward. Further, the paper discharge space opens toward the front of the main body of the image forming apparatus, so that the paper sheets discharged into the paper discharge space are taken out forward.

Consider a case where paper sheets received by a FAX are outputted, for example. In an image forming apparatus in which a paper discharge tray is projected sideward from its main body, the paper sheets discharged into the paper discharge tray are not forgotten because they are very noticeable from above.

In the image forming apparatus having the paper discharge space provided in its main body, however, paper sheets discharged into the paper discharge space cannot be visually confirmed from above, whereby the paper sheets may be forgotten. For example, if an operator bends and looks into the paper discharge space from the front of the paper discharge space, the presence or absence of the paper sheets can be confirmed. However, such an operation is troublesome to the operator and is liable to be forgotten.

In a case where the paper sheets are conveyed on a center basis by a paper conveying path, when the paper sheets discharged into the paper discharge space are narrow, edges on the take-out side (front edges) of the paper sheets are in an inner position of the paper discharge space. As a result, the paper sheets are difficult to take out.

SUMMARY OF THE INVENTION

An object of the present invention is to provide an image forming apparatus in which economy of space is achieved, and a discharged paper sheet is not forgotten and is easily taken out.

In order to attain the above-mentioned object, in a preferred mode of the present invention, an image forming apparatus comprises its main body, an optical system for illuminating an original put on an original platen surface to obtain an image corresponding to its original surface, an image forming section for recording on a paper sheet the image obtained by the optical system, and a paper conveying section for discharging the paper sheet into a paper discharging section along the transverse direction through a paper conveying path passing through the image forming section. The main body of the image forming apparatus includes a first portion containing the optical system and a second portion containing the image forming section and the paper conveying section below the first portion. The paper discharging section is so provided as to open toward the front thereof from which the paper sheet taken out is provided between the first portion and the second portion. The first portion is shifted by a predetermined amount backward from the position where it is lined up with the second portion.

In this mode, the first portion is shifted backward. Therefore, it is possible for an operator to easily visually confirm from above, the paper sheet discharged into the paper discharge section below the first portion. As a result, the operator does not forget to take the paper sheet.

If a part of a driving member for driving the optical system is arranged below the first portion and behind the second portion, it is preferable in the following points. That is, the driving member including a motor or the like for driving the optical system is arranged behind the first portion. Therefore, the driving member is projected backward by merely shifting the first portion backward. As a result, a plane space occupied by the main body of the image forming apparatus is increased. On the other hand, in the present embodiment, a part of the driving member is arranged below the first portion and behind the second portion, the space of the image forming apparatus can be saved while ensuring the visibility of the paper sheet discharged into the paper discharging section.

In another preferred mode of the present invention, the paper sheet is so discharged that its front edge on the takeout side is along a predetermined line spaced a predetermined distance apart from a front edge of the paper discharging section irrespective of the paper size.

In this mode, the front edge of the paper sheet discharged into the paper discharging section is at a predetermined distance from the front edge of the paper discharging section irrespective of the paper size, whereby the paper sheet is easy to take out forward.

An operation panel or the like may be arranged so as to occupy a portion of a space formed in front of the first portion shifted backward. If a part of the paper sheet can be visually confirmed through the remaining part of the space formed in front of the first portion, it is sufficient to confirm the presence of the paper sheet.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a schematic view showing a rear frame of a first portion.

DETAILED DESCRIPTION OF THE PREFERRED EMBODIMENT

Figure 1:
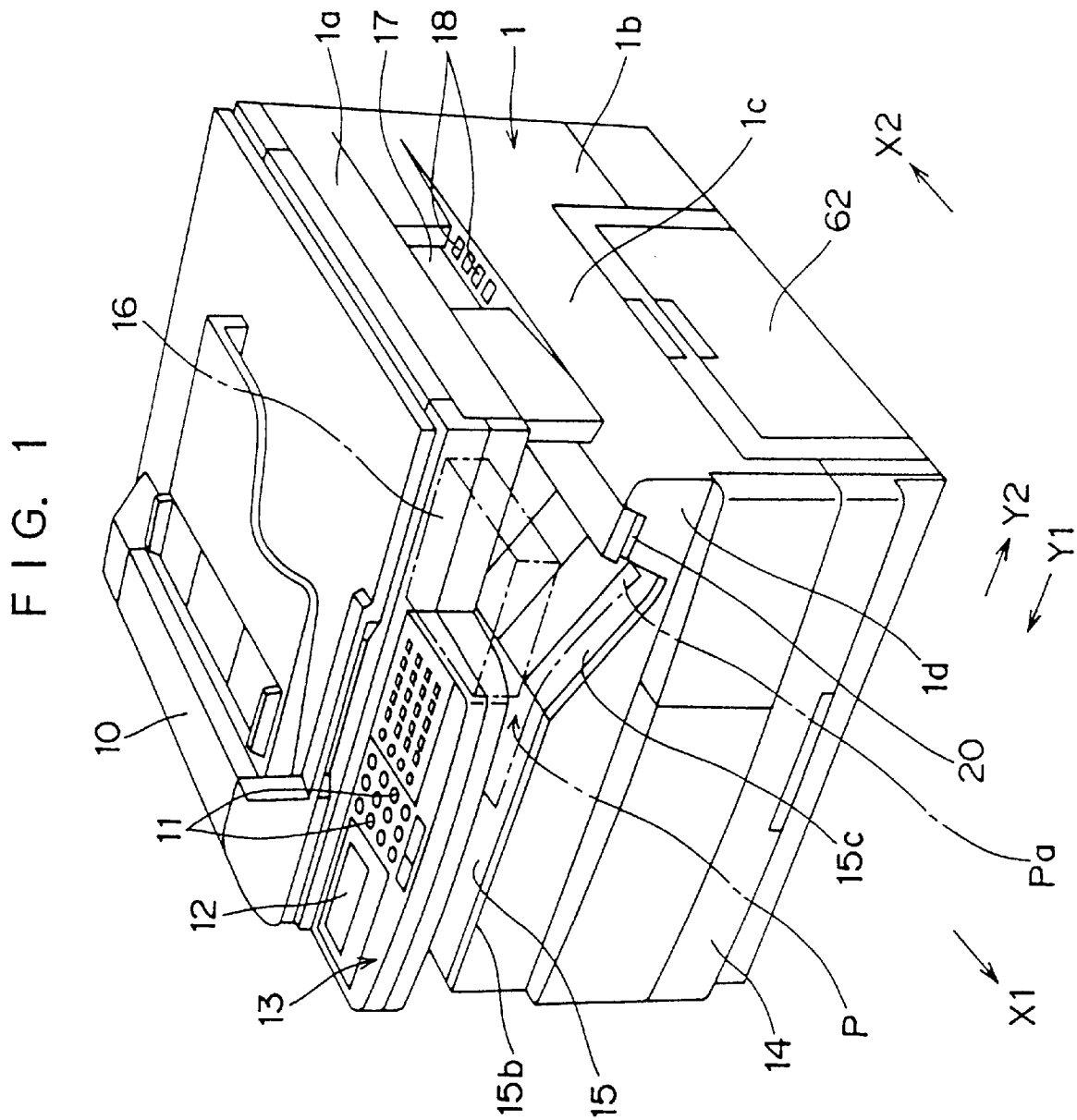
FIG. 1 is a schematic perspective view showing an image forming apparatus according to one embodiment of the present invention.

An embodiment of the present invention will be described while referring to the drawings.

Referring to FIG. 1, an automatic document feeder 10 (hereinafter merely referred to as an ADF 10) is provided on the upper surface of the main body of an image forming apparatus 1, and an operation panel 13 having various operation keys 11 and a display section 12 is arranged in front of the upper part of the main body of the image forming apparatus 1. The operation panel 13 is thus arranged in front of the upper part of the main body of the image forming apparatus 1, whereby the upper surface of the main body of the image forming apparatus 1 is so effectively utilized that the ADF 10 is arranged thereon. Further, the main body of the image forming apparatus 1 has a paper discharging section 15 opening toward the front X1 below the operation panel 13. A paper feeding cassette 14 which can be pulled out forward X1 from the main body of the image forming apparatus 1 is mounted on the lower part of the main body of the image forming apparatus 1.

On the other hand, the image forming apparatus is equipped with a modem for modulating image data to be transmitted and demodulating image data to be received and an NCU (Network Control Unit) for making connection to an external communication network, which is not illustrated, in order to perform a facsimile function in addition to a copy function.

Figure 2:
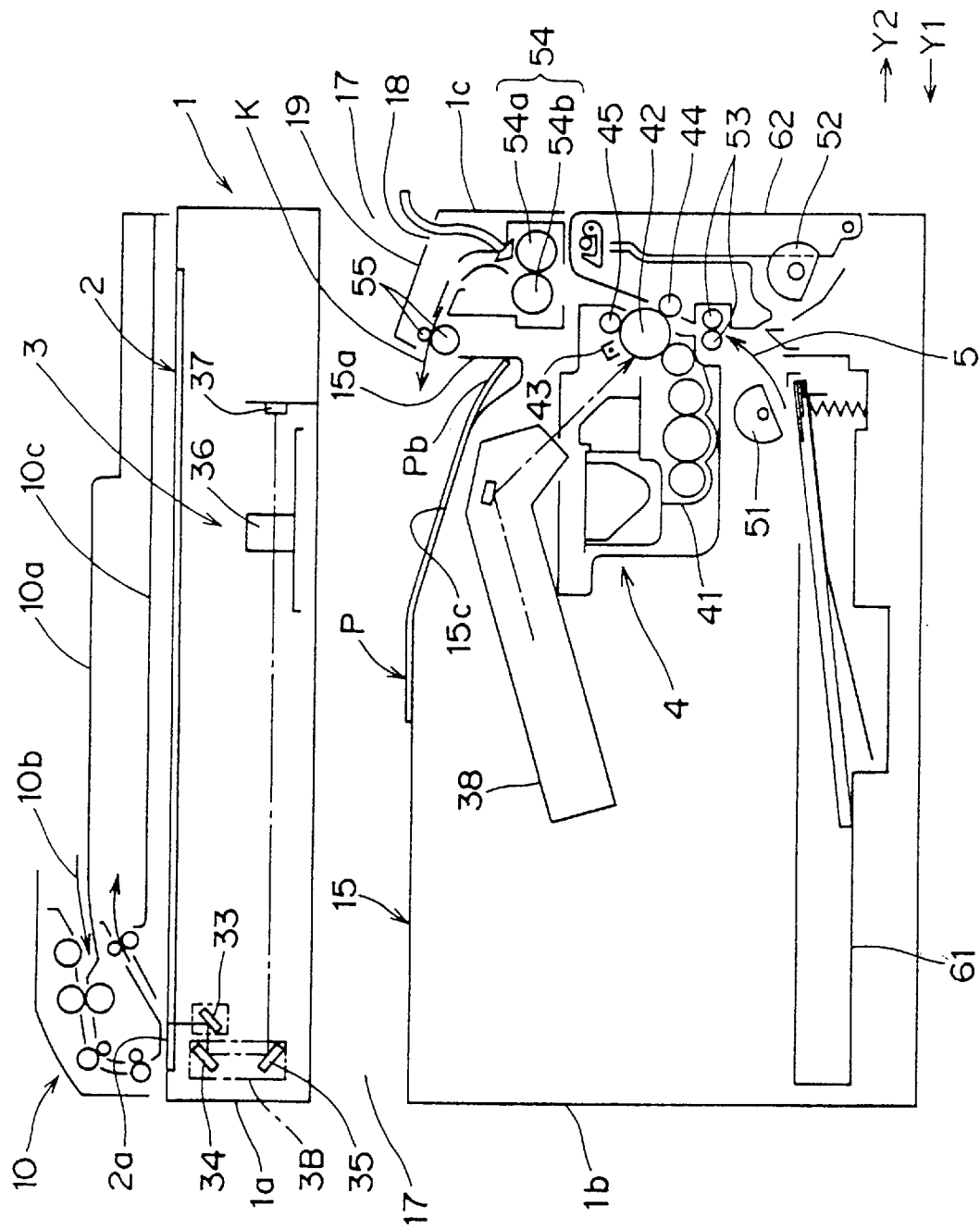
FIG. 2 is a schematic front view showing the internal construction of the image forming apparatus.

Referring to FIG. 2 which is a schematic front view showing the internal cross section of the image forming apparatus, in the image forming apparatus, when the ADF 10 is used, an original is conveyed to a reading region for ADF 2a by the ADF 10, while its original surface is illuminated and scanned by an optical system brought into a fixed state, and an image is formed on the basis of the illumination and scanning. On the other hand, when a book original, for example, is put on an original platen surface 2 to make copies, its original surface is illuminated and scanned by a moving optical system, and an image is formed on the basis of the illumination and scanning.

In the ADF 10, when a plurality of originals whose surfaces are directed upward are set in an original setting section 10a, the originals pass through the reading region 2a set in an end of the original platen surface 2 while being reversed through an original conveying path 10b, and are then successively discharged into an original discharge stand 10c in a state where they are turned over in descending order from the uppermost original.

The main body of the image forming apparatus 1 comprises in its inner part (1) an optical system 3 for illuminating and scanning an original put on the original platen surface 2 or an original conveyed to the reading region for ADF 2a by the ADF 10 and introducing light reflected from the original into the photosensitive drum 42, (2) an image forming section 4 for developing an electrostatic latent image formed on a photosensitive drum 42 by a developing device 41 and then transferring the electronic latent image on paper sheets, (3) a paper conveying section 5 for pulling out the paper sheets from a paper feeding cassette 61 or a manual paper feeding tray 62 opened at required time and discharging the paper sheets into a paper discharging section 15 in the main body of the image forming apparatus 1 through the image forming section 4, and the like.

The optical system 3 illuminates the original by a fluorescent lamp with a reflecting plate (not shown) fixed to a first moving frame 3A, accepts the light reflected from the original in a line sensor 37 successively through a first mirror 33 fixed to the first moving frame 3A, a second mirror 34 fixed to a second moving frame 3B, a third mirror 35, and a lens 36, and irradiates laser light corresponding to input to the line sensor 37 onto the photosensitive drum 42 by a laser optical system 38. The laser optical system 38 is a known one including a laser oscillator, a modulator, a lens, and a rotating polygon mirror, which are not illustrated in detail.

As the image forming section 4, a charging corona discharger 43, a developing device 41, a transfer roller 44, and a cleaning roller 45 are arranged in this order around the photosensitive drum 42. The image forming section 4 is so adapted as to form an original image on an outer peripheral surface of the photosensitive drum 42 uniformly charged by the charging corona discharger 43 to form an electrostatic latent image, then develop the electrostatic latent image into a toner image by the developing device 41, transfer the toner image on the paper sheets by the transfer roller 44, and recover the remaining toner by the cleaning roller 45. The image forming section 4 is formed as a unit as a whole, and can be integrally pulled out forward X.

The paper conveying section 5 comprises a paper feeding roller 51 for pulling out paper sheets P one at a time from the paper feeding cassette 61, a paper feeding roller 52 for pulling out the paper sheets from the manual paper feeding tray 62, a pair of registration rollers 53 for causing the paper sheets P conveyed by each of the paper feeding rollers 51 and 52 to temporarily wait with leading ends of the paper sheets P abutting thereon, a heat roller 54b and a pressure roller 54a which constitute a fixing roller 54 for fixing a toner image transferred on the paper sheets P, and a pair of discharge rollers 55 in this order. The discharge rollers 55 discharge the paper sheets P leftward Y1 along the direction of conveyance K in FIG. 1.

Figure 3:
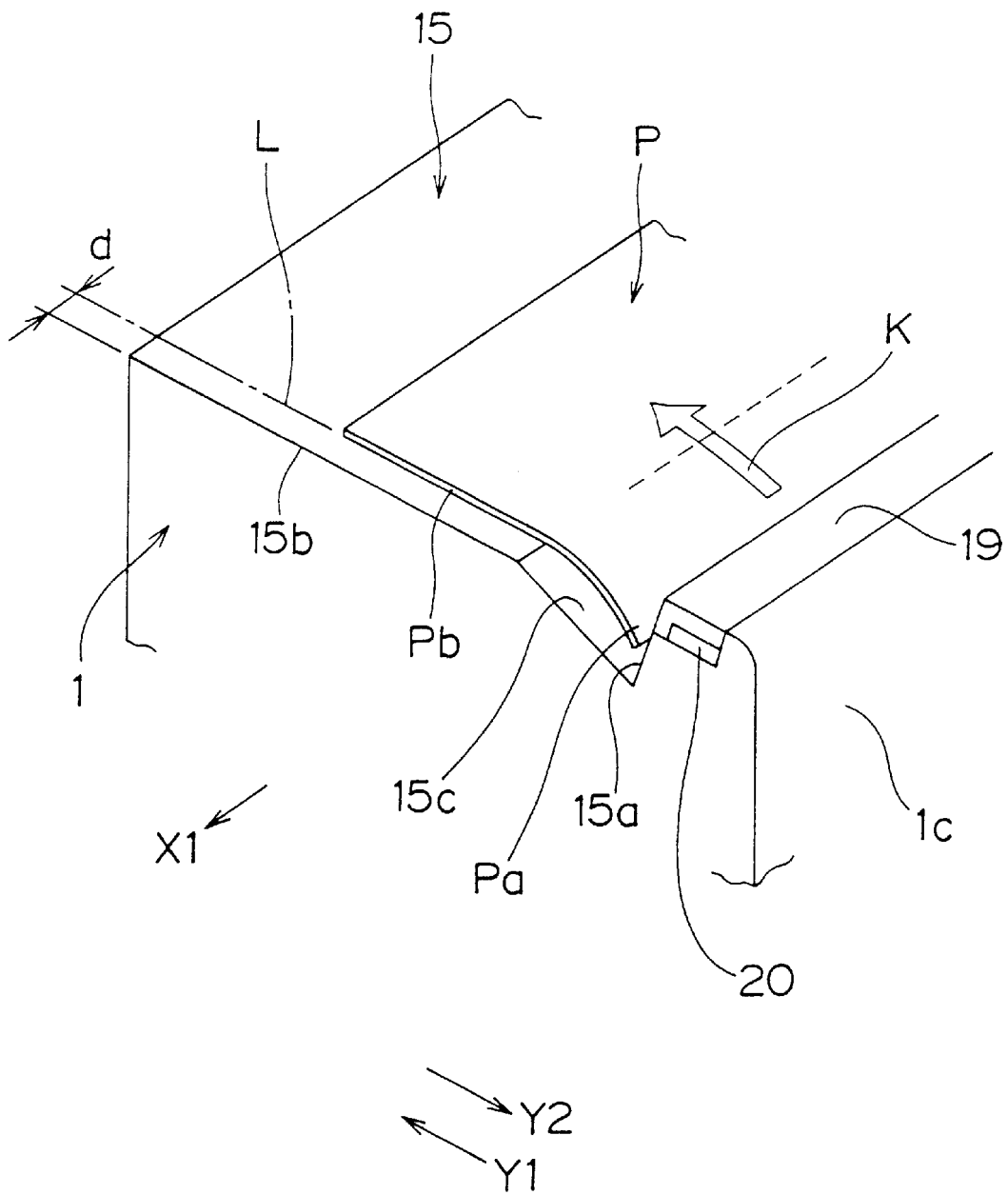
FIG. 3 is a schematic enlarged perspective view showing a paper discharging section.

Referring to FIG. 2, and FIG. 3 which is an enlarged schematic perspective view of the paper discharging section 15, the paper sheets are discharged into the paper discharging section 15 leftward Y1 along the direction of conveyance K. The paper discharging section 15 has a inclined section 15c so inclined that its part corresponding to rear ends Pa in the direction of conveyance of the paper sheets P discharged is the lowest (inclined downward toward the right Y2 in the drawings). The rear ends Pa in the direction of conveyance of the paper sheets P discharged into the paper discharging section 15 are lined up at a rear end 15a in the direction of conveyance of the paper discharging section 15 by the function of the inclined section 15c. Even if a lot of paper sheets P are discharged into the paper discharging section 15 to enter a laminated state, the rear ends Pa in the direction of conveyance of the paper sheets P in the laminated state do not prevent a paper sheet P to be subsequently discharged from being discharged.

Figure 5:
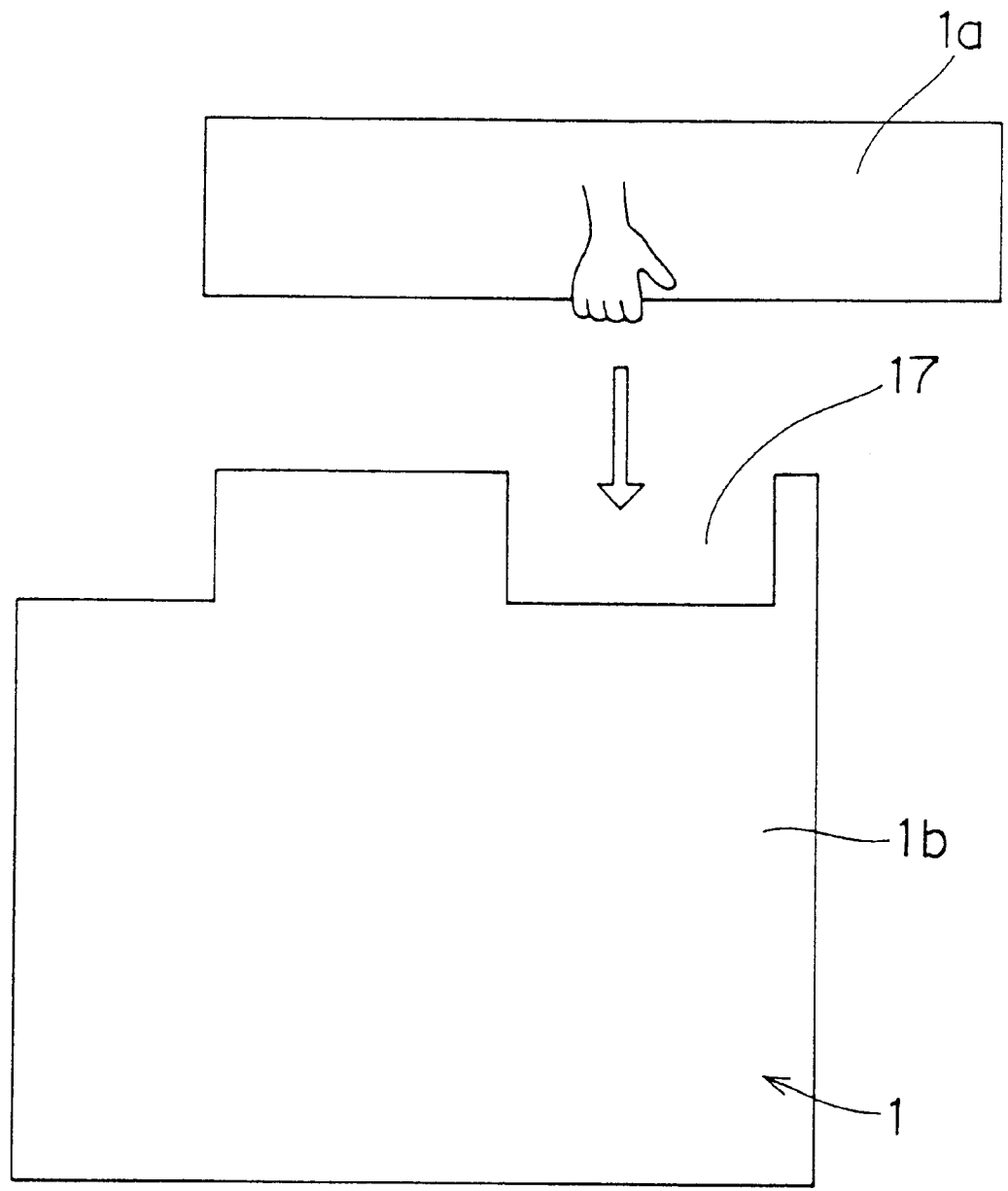
FIG. 5 is a schematic side view showing one step in a case where the main body of the image forming apparatus is assembled.

As mentioned above, the optical system 3, the image forming section 4, the paper conveying section 5, and the like are contained in the main body of the image forming apparatus 1. However, referring to FIG. 2, a first portion 1a containing the optical system 3 and a second portion 1b containing the image forming section 4 and the paper conveying section 5 below the first portion 1a are separably constructed. When the image forming apparatus is assembled, the first portion 1a and the second portion 1b are combined with each other with the first portion 1a put on the second portion 1b, as shown in FIG. 5. The paper discharging section 15 is provided on the upper part of the second portion 1b and is interposed between the first portion 1a and the second portion 1b.

On the other hand, referring to FIGS. 1 and 2, openings 17 (only one of them is illustrated in FIG. 1) serving as windows for lighting which connect the paper discharging section 15 with the exterior are respectively formed on both side surfaces of the main body of the image forming apparatus 1. Consequently, light is introduced into the paper discharging section 15 so that a space of the paper discharging section 15 is not darkened, to make it easy to visually confirm the paper sheets P discharged into the paper discharging section 15.

Each of the openings 17 is provided in an abutting portion of respective side surfaces of the first and second portions 1a and 1b. The size and the position of each of the openings 17 are so set that an operator's hand supporting a lower edge in an approximately central position of each of side surfaces of the first portion 1a can be introduced into the opening, as shown in FIG. 5, at the time of assembling the image forming apparatus. When the main body of the image forming apparatus 1 is assembled, therefore, the hands are prevented from being caught between the first portion 1a and the second portion 1b, and both the portions 1a and 1b are combined with each other with high positional precision. Since the opening 17 is arranged in the second portion 1b in the present embodiment, it may be arranged in the first portion 1a or arranged so as to extend over both the portions 1a and 1b.

Furthermore, a plurality of main vent holes 18 facing the opening 17 on a right side surface 1c of the main body of the image forming apparatus 1 are provided in a section 19 for sectioning an upper surface on the right side of the second portion 1b so as to connect with the paper discharging section 15. On the other hand, a sub vent hole 20 having an open area significantly smaller than the open area of the whole of the plurality of main vent holes 18 is formed in the upper part of a front surface 1d of the second portion 1b. Cooling air is supplied to the fixing roller 54 through the vent holes 20 and 18.

Figure 4:
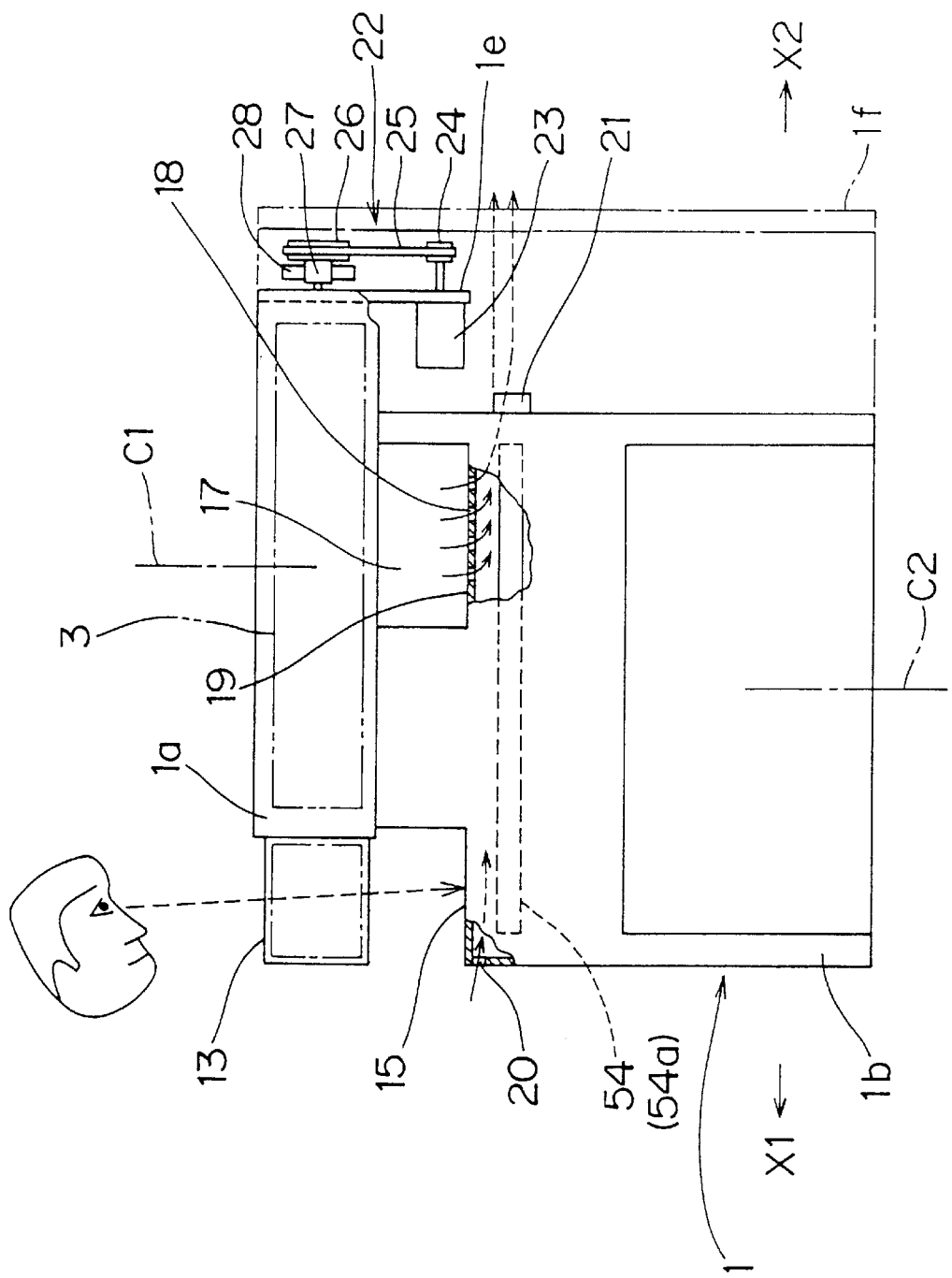
FIG. 4 is a partially broken schematic right side view of the main body of the image forming apparatus.

Referring to FIG. 4 which is a partially cutaway right side view of the main body of the image forming apparatus 1 (FIG. 4 shows a state where a surface cover on the right side surface of the main body of the image forming apparatus 1 is removed so that a plate-shaped frame is exposed), the fixing roller 54 is arranged along the forward direction X1 and the backward direction X2 in the image forming apparatus, and is in close proximity to the main vent holes 18. A fan for air blowing 21 is arranged in close proximity to a rear end in the axial direction of the fixing roller 54, and the fan 21 sucks air from the vent holes 20 and 18 to blow air backward X2 in the axial direction of the fixing roller 54.

The periphery of the fixing roller 54 is so sectioned that air hardly flows into the fixing roller 54 from portions other than the vent holes 20 and 18. Further, the amount of air introduced from the sub vent hole 20 is so set as to be significantly smaller than the amount of air introduced from the whole of the main vent holes 20. On the other hand, the main vent holes 18 mainly correspond to a portion on the downstream side in the direction of air blowing of the fixing roller 54, to mainly cool the portion on the downstream side in the direction of air blowing. Consequently, the temperature distribution in the axial direction of the fixing roller 54 is made uniform. The height of a lower end of a rear frame 1e is so set that the rear frame 1e does not block the flow of air expelled by the fan 21.

As shown in FIG. 4, the first portion 1a is arranged in a state where it is shifted by a predetermined amount backward X2 from the position where it is lined up with the second portion 1b (in FIG. 4, C1 denotes a line indicating the center in the longitudinal direction of the optical system 3, and C2 denotes a line indicating the center in the longitudinal direction of the image forming section). Consequently, a vacant space is formed in front of the first portion 1a. However, the operation panel 13 is so arranged as to occupy a part of the vacant space (see FIG. 1), and a side space 16 is formed on the right Y2 of the operation panel 13 by the remaining space. An operator can visually confirm from above the presence or absence of the paper sheets P discharged into the paper discharging section 15, as shown in FIG. 4, through the side space 16. Since the side space 16 is positioned above the rear ends Pa in the direction of conveyance of the discharged paper sheets P, as shown in FIG. 1, it can be easily visually confirmed whether or the paper sheets P exist in the paper discharging section 15 irrespective of the paper size.

Referring to FIG. 4 and FIG. 6 showing a rear frame of the first portion 1a, a driving member 22 for driving the optical system 3 contained in the first portion 1a is supported on the rear frame 1e in the first portion 1a. The driving member 22 comprises a motor 23, a driving pulley 24 fixed to the axis of rotation of the motor 23, a driven pulley 26 driven by the driving pulley 24 through a belt 25, a first gear 27 rotated integrally with the driven pulley 26, and a second gear 28 engaged with the first gear 27. The motor 23 and the driven pulley 24 out of the members 23 to 27 included in the driving member 22 are arranged behind the second portion 1b.

Particularly, the motor 23 is arranged in a vacant space formed below the first portion 1a and behind the second portion 1b by shifting the first portion 1a backward. The vacant space means the space where the second portion 1b does not exist below the first protion 1a. If the first portion 1a is merely shifted backward with the motor 23 arranged on the rear surface of the first portion 1a, a plane space occupied by the whole of the image forming apparatus is widened. In the present embodiment, however, the motor 23 is arranged behind the second portion 1b, a plane space occupied by the image forming apparatus is not increased.

Since the motor 23 is mounted on an inner side surface of the rear frame 1e, referring to FIG. 4, it is arranged at a distance away from a rear cover if of the main body of the image forming apparatus 1 (that is, in an inner part of the main body of the image forming apparatus 1), and is arranged in a state where it is shielded by the rear frame 1e, as compared with a conventional case where it is mounted on an outer side surface of the rear frame 1e. As a result, a motor sound at the time of operating the apparatus cannot easily escape outward from the apparatus, whereby the decrease in noise is expected.

As shown in FIG. 3, a paper conveying path is so set that the paper sheets P are discharged in a state where front edges Pb on the take-out side of the paper sheets P discharged into the paper discharging section 15 are along a line L at a predetermined small distance d (for example, 20 mm) apart from the front edge 15b of the paper discharging section 15. That is, the paper conveying path forms a so-called front basis of the apparatus. Since the paper conveying path thus forms such a front basis, the front edges Pb of the paper sheets P discharged into the paper discharging section 15 are at a predetermined small distance (for example, 20 mm) apart from the front edge 15b of the paper discharging section 15. As a result, the paper sheets P are easily taken out forward from the paper discharging section 15 irrespective of the paper size.

According to the present embodiment, the first portion 1a in the main body of the image forming apparatus 1 is shifted backward X2, the operator can easily visually confirm from above the paper sheets P discharged into the paper discharging section 15 below the first portion 1a. As a result, the operator does not forget to take the paper sheets P.

Furthermore, the paper sheets are conveyed on the front basis of the apparatus. The front edges Pb of the paper sheets P discharged into the paper discharging section 15 are positioned near the front edge 15b of the paper discharging section 15 irrespective of the paper size. As a result, the paper sheets P are easily taken out forward from the paper discharging section 15.

A vacant space is formed behind the second portion 1b by shifting the first portion 1a backward. A driving motor 23 for the optical system 3 which is generally arranged behind the first portion 1a is arranged in the vacant space, so that effective utilization of the space is achieved. That is, in the present embodiment, the space of the image forming apparatus can be saved while ensuring the visibility of the paper sheets P discharged into the paper discharging section 15.

Furthermore, a part of the vacant space formed in front of the first portion 1a shifted backward is taken as a space for visually confirming the paper sheets P in the paper discharging section 15 (a side space 16), and the remaining space can be utilized as a space where required members such as the operation panel 13 as in the present embodiment are arranged. Therefore, effective utilization of the space is also achieved in this respect.

The present invention is not limited to the above-mentioned embodiment. Various changes can be made in the scope of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

a main body;

an optical system for illuminating an original put on an original platen surface to obtain an image corresponding to an original surface;

an image forming section for recording on a paper sheet the image obtained by the optical system; and a paper conveying section for discharging the paper sheet into a paper discharging section along a transverse direction through a paper conveying path passing through the image forming section, the main body of the image forming apparatus including a first portion containing the optical system and a second portion containing the image forming section and the paper conveying section below the first portion, the paper discharging section being so provided as to open toward the front thereof from which the paper sheet to be taken out is provided between the first portion and the second portion, and the first portion being shifted by a predetermined amount backward from a position where the first portion otherwise would be lined up with the second portion to provide a vacant space defined by a front region of the first portion and an upper region of the second portion whereby a presence or an absence of a discharged sheet in the discharging section can be confirmed visually by looking from above the vacant space, through the vacant space into the discharging section.

2. An image forming apparatus according to claim 1, wherein the first portion comprises a driving mechanism including a motor for driving the optical system, and at least a part of the driving mechanism is arranged in a vacant space formed below the first portion and behind the second portion.

3. An image forming apparatus according to claim 2, wherein the motor is arranged inside an outline of the first portion in a plan view.

4. An image forming apparatus according to claim 3, further comprising a rear frame for supporting the motor behind the motor, and wherein the main body includes a rear cover arranged behind the rear frame.

5. An image forming apparatus according to claim 1, wherein a front edge of the paper sheet discharged into the paper discharging section is along a predetermined line spaced a predetermined distance apart from a front edge of the paper discharging section.

* * * * *